(12) United States Patent
Yamazaki

(10) Patent No.: US 7,364,310 B2
(45) Date of Patent: Apr. 29, 2008

(54) IMAGE PROJECTION SYSTEM

(75) Inventor: Takeshi Yamazaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 203 days.

(21) Appl. No.: 11/153,212

(22) Filed: Jun. 15, 2005

(65) Prior Publication Data
US 2005/0275813 A1 Dec. 15, 2005

(30) Foreign Application Priority Data
Jun. 15, 2004 (JP) ............................ 2004-176971

(51) Int. Cl.
G03B 21/14 (2006.01)
(52) U.S. Cl. .......................... 353/97; 353/94
(58) Field of Classification Search ................ 353/122, 353/97, 88, 94, 74, 75, 69, 70, 30; 359/443, 359/451; 352/204, 242–244
See application file for complete search history.

(56) References Cited

U.S. PATENT DOCUMENTS

2003/0227599 A1* 12/2003 Weissman et al. ............ 353/94
2006/0152680 A1* 7/2006 Shibano ....................... 353/30

FOREIGN PATENT DOCUMENTS

| JP | 2000-352763 | 12/2000 |
| JP | 2002-207188 | 7/2002 |

* cited by examiner

Primary Examiner—William C. Dowling
(74) Attorney, Agent, or Firm—Volpe & Koenig PC

(57) ABSTRACT

The overlapping portions of an image composed of partial images projected on a dome-shaped screen from image projecting means are shaded in light by means of light shading mechanisms which are provided for the corresponding image projecting means. Each light shading mechanism includes at least one light shading plate with a notch formed therein, and after projection, the notch is defined by a first curved edge line corresponding to a center line of a first over-lapping portion of the overlapping portions and a second curved edge line corresponding to a center line of a second overlapping portion of the overlapping portions. As a result, the luminance of the image projected on the dome-shaped screen can be easily adjusted in the same manner as a planer screen.

8 Claims, 12 Drawing Sheets

IMAGE PROJECTION SYSTEM

BACKGROUND OF THE INVENTION (i) Field of the Invention

The present invention relates to an image projection system wherein in the case that the corresponding images from a plurality of image projection means are independently projected on a dome-shaped screen to create one total combined image on the dome-shaped screen, the joints of the total combined image can be removed finely so that the quality of the total combined image can be enhanced by providing light-shading mechanisms for adjusting the image displaying conditions of the overlapping portions of the total combined image for the image projection means, respectively.

(ii) Description of the Related Art

In an image projection system to display a total image which is obtained by combining a plurality of partial images on a screen, the luminance at the overlapping portion of a plurality of (n) projecting light fluxes is n times (n=2, 3 . . . ) as high as the luminance of the non-overlapping portion, if the image displaying condition of the overlapping portion is not adjusted, so-called "black image rising" is created due to light flux leaks from the light bulbs and the internal leak lights from the optical elements to deteriorate the quality of the total image. In this point of view, such a method is generally available as providing light shading plates for reducing the luminance of the overlapping portion for the image projection means, respectively so that the luminance of the overlapping portions can be set equal to the luminance of the non-overlapping portions.

Such an image projection system as projecting and overlapping the corresponding images from a plurality of image projecting means to display one large-sized image on a dome-shaped screen is proposed (see, Patent Publication No. 1). In the image projection system, four projectors as image projecting means are provided vertically and laterally for the dome-shaped screen so that the light fluxes constituting the partial images from the corresponding projectors are projected diagonally and light shading plates for adjusting the image displaying conditions of the overlapping portions of the partial images are provided for the projectors. The light shading plate are disposed in the spaces between the projectors and the dome-shaped screen.

[Patent Publication No. 1]
Japanese Patent Publication No. 3462470

SUMMARY OF THE INVENTION (iii) Problems to be Solved by the Present Invention In an image projection system using a planer screen wherein a projected image is shaped in plane, a light flux from a projector is projected on a rectangular projection area of the screen. Therefore, if the corresponding images from four projectors are projected vertically and laterally on the screen, the overlapping portions of the images are shaped rectangularly. Therefore, if light shading plates are provided so that the center lines of the overlapping portions are matched to the edge lines of the light shading plates, the luminance of the overlapping portions can be set equal (blended) to the luminance of the non-overlapping portions.

In an image projection system using a dome-shaped screen with a spherical projecting area, a light flux from a projector is projected obliquely on the projecting area of the dome-shaped screen. In this case, since the projected area of the image is not shaped rectangularly, but shaped in such a complicated shape as shown in FIG. 9 to which detail explanation will be done later, the shape of the overlapping portion as designated by reference number "10" becomes a complicated shape as shown in FIG. 9. In this case, if a light shading plate provided so that the center line 11 of the overlapping portion 10 is matched to the edge line of the light shading plate, the luminance of the overlapping portion can be adjusted as in the same manner as the image projection system using the planer screen. In this case, however, if the edge line of the light shading plate is shaped linearly, the edge line can not be matched to the center line 11 of the overlapping portion 10 because the edge line is projected in curve on the dome-shaped screen. In this point of view, in the use the image projection system using the dome-shaped screen, it is difficult to adjust the luminance of the overlapping portion 10. In this point of view, it is suggested in Patent Publication No. 1 to bend the light shading plate from the description of "the light shading plates being shaped in curve which are to be disposed at left side and upside, respectively", but Patent Publication No. 1 does not refer to the bending means and bending portion and the relation between the light shading bending and the blending effect, concretely. Therefore, the blending effect of the luminance of the overlapping portion being set equal to the luminance of the non-overlapping portion can not be conceived from Patent Publication No. 1.

In view of the above-mentioned problems, it is an object of the present invention to provide an image projection system wherein in the use of a dome-shaped screen, the luminance of overlapping portions can be set equal to the luminance of non-overlapping portions by light shading mechanisms with high blending effect.

In order to achieve the above object, the invention of claim 1 relates to an image projection system comprising:
 a plurality of image projecting means, and
 a plurality of light shading mechanisms for adjusting image displaying conditions of overlapping portions of an image composed of partial images projected on a dome-shaped screen from the image projecting means, each mechanism being provided for each image projecting means,
 wherein each light shading mechanism includes at least one light shading plate with a chipped form therein, and after projection, the chipping is defined by a first curved edge line corresponding to a center line of a first overlapping portion of the overlapping portions and a second curved edge line corresponding to a center line of a second overlapping portion of the overlapping portions.

The invention of claim 2 relates to an image projection system as defined in claim 1, wherein each light shading mechanism is provided detachably from the corresponding light shading position on an optical path of the corresponding image projecting means.

The invention of claim 3 relates to an image projection system as defined in claim 1, wherein the dome-shaped screen is formed in a partially semisherical shape by cutting a bottom portion of the screen by a given dimension in the order smaller than a radium of the screen, and the image projecting means are arranged at a right side and a left side of the screen as viewed from a front of the screen so that projecting directions of the image projecting means are directed downward and upward for the screen, respectively.

The invention of claim 4 relates to an image projection system as defined in claim 1, wherein each light shading mechanism includes a first shading plate with the first curved edge line and a second shading plate with the second curved edge line.

The invention of claim 5 relates to an image projection system as defined in claim 1, wherein the image projecting means are supported by free camera platforms to vary projecting directions of the image projecting means freely, respectively.

The invention of claim 6 relates to an image projection system as defined in claim 4, wherein the first shading plate and the second shading plate are made of metallic material.

According to the invention of claim 1, when the corresponding images from the projectors are projected and combined to create a large-sized image on the dome-shaped screen, the image displaying condition of the overlapping portion of the large-sized image is adjusted by means of the light shading plates with the curved edge lines which are provided for the projectors, respectively. The curved edge lines are shaped by the chipped form in the plates. In this case, for example, the light shading plates includes a first light shading plate with a curved edge line corresponding to the center line of an overlapping portion and a second light shading plate with a curved edge line corresponding to another center line of another overlapping portion. As a result, the vertical sides or the lateral sides (right side and left side) of the overlapping portion, which is originated from the overlapping of the light fluxes from the projectors, can be adjusted in luminance by means of the light shading plates so that after projection, the curved edge lines of the light shading plates are matched to the center lines of the overlapping portions. Therefore, the luminance of the image projected on the dome-shaped screen can be adjusted in the same manner as the planer screen and the black image rising can be prevented effectively. Accordingly, the luminance of the overlapping portions can be set easily equal to the luminance of the non-overlapping portions on the dome-shaped screen, so that a high blending effect can be provided to the image projection system of the present invention.

According to the invention of claim 2, since the light shading mechanisms are provided detachably from the corresponding light shading positions on the optical paths of the corresponding image projecting means, in the geometrical correction to adjust the positions of the partial images from the image projecting means, the capturing data for the geometrical correction can be obtained while the light shading mechanisms are removed from the corresponding light shading positions. As a result, the geometrical correction can be carried out appropriately.

According to the invention of claim 3, since the dome-shaped screen is formed in a partially semisherical shape by cutting a bottom portion of the screen by a given dimension in the order smaller than a radium of the screen, and the image projecting means are arranged at a right side and a left side of the screen as viewed from a front of the screen so that projecting directions of the image projecting means are directed downward and upward for the screen, respectively, the corresponding images can be projected directly on the upper right side, the lower right side, the upper left side and the lower left side of the large-sized screen from the projectors without reflective mirrors. Therefore, observers can view some images on the dome-shaped screen without the block of the reflective mirrors, so that the customer service quality of the image projection system can be enhanced.

BRIEF DESCRIPTION OF THE DRAWINGS

In order to bring about a greater understanding of the present invention, a description will be given on the accompanying drawings.

DETAILED DESCRIPTION OF THE PREFERRED EMBODIMENTS

The present invention will now be described hereinafter with reference to the accompanying drawings.

First Embodiment

Figure 1:
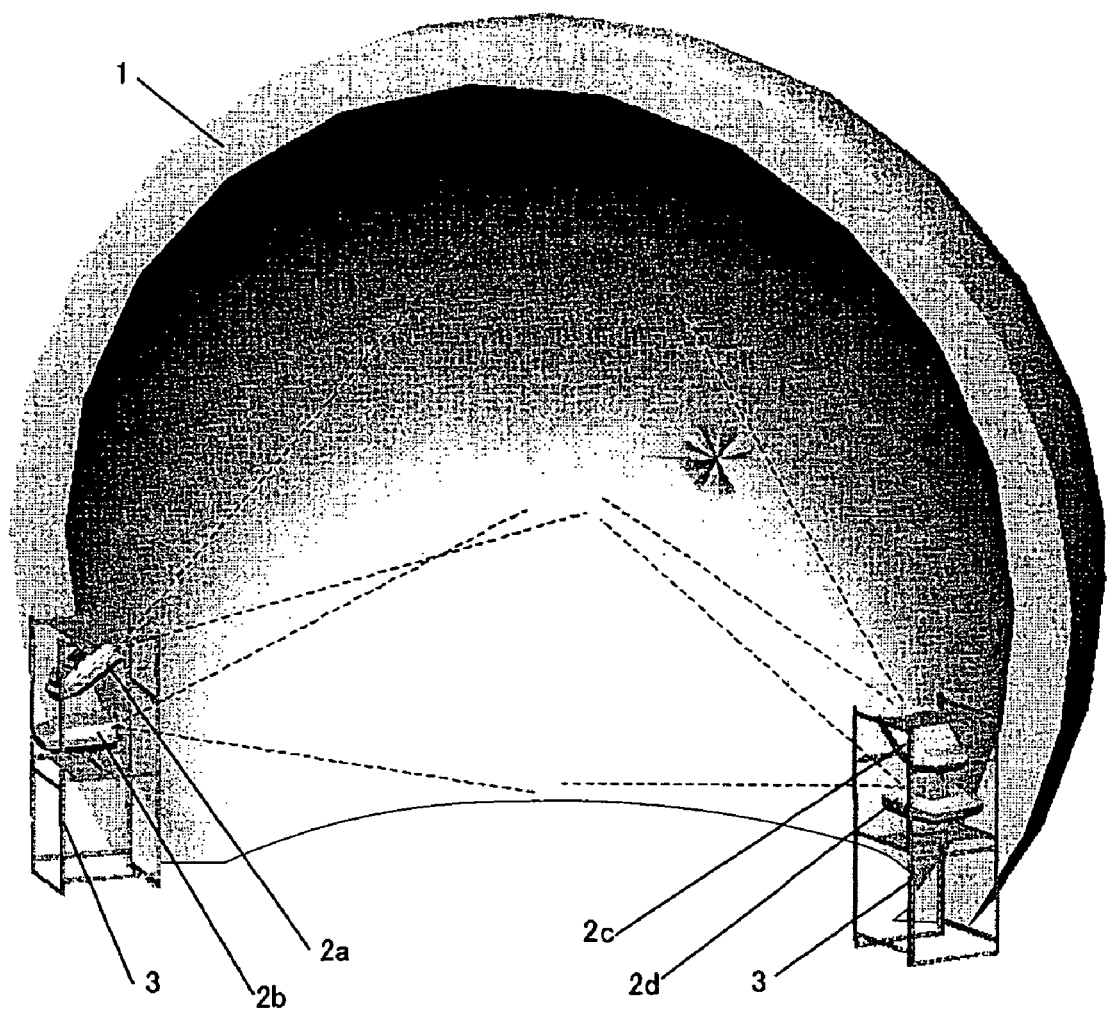
FIG. 1 is a structural view schematically showing an image projection system according to a first embodiment of the present invention.
Figure 2:
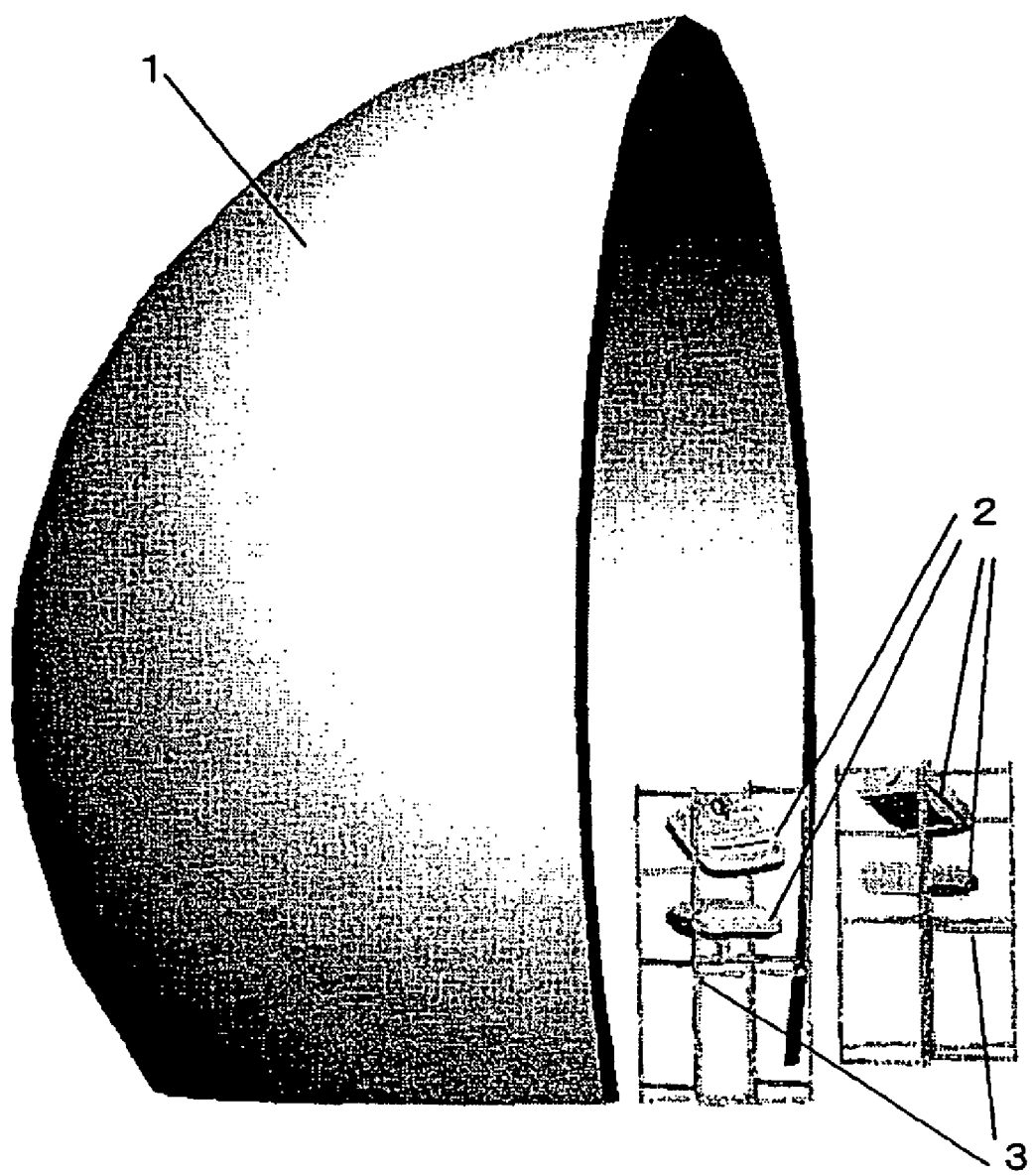
FIG. 2 is another structural view schematically showing an image projection system according to a first embodiment of the present invention.
Figure 3:
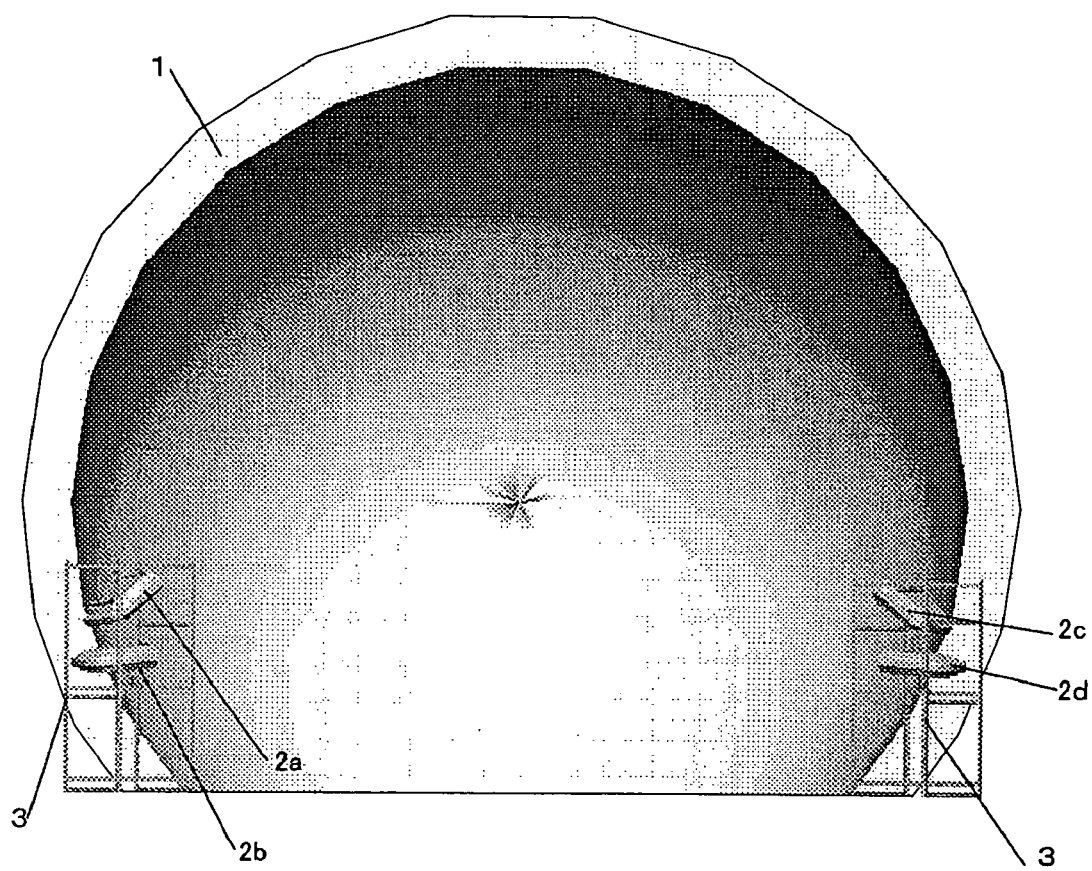
FIG. 3 is still another structural view schematically showing an image projection system according to a first embodiment of the present invention.

FIGS. 1-3 relate to an image projection system according to a first embodiment of the present invention. As is apparent from FIGS. 1-3, the image projection system includes a dome-shaped screen 1, four projectors 2 (2a, 2b, 2c, 2d) as image projecting means which are configured such that the projectors can project the corresponding partial images directly on the upper right side, the lower right side, the upper left side and the lower left side of the screen 1 and such that some (in this embodiment, two) of the projectors are provided in the right side with respect to the opening of the dome-shaped screen 1 and the other projectors (in this embodiment, two) are provided in the left side with respect to the opening of the dome-shaped screen 1, and a supporting structure 3 to support the projectors 2a-2d. The dome-shaped screen is formed in a partially semisherical shape by cutting the bottom portion of the screen by a given dimension in the order smaller than the radium R of the screen. In this embodiment, the dome-shaped screen 1 is constituted from a large-sized screen with a diameter of six meters. Then, the corresponding images are projected directly on the upper right side, the lower right side, the upper left side and the lower left side of the large-sized screen from the projectors 2a-2d without reflective mirrors. Therefore, observers can view some images on the dome-shaped screen without the block of the reflective mirrors, so that the customer service quality of the image projection system can be enhanced.

In this embodiment, the projectors 2a-2d may be constituted from projectors with high resolution of XGA (1024× 768 dots), respectively. In this case, the corresponding images from the projectors are combined to create a total image of high resolution with about two millions pixel numbers. As the projectors may be exemplified reflective liquid crystal projectors, transmittance liquid crystal projectors and DLPs. The resolution of the projectors 2a-2d are not limited to the XGA, but developed to SXGA or UXGA, for example. In this case, the resolution of the total image can be more enhanced.

Figure 4:
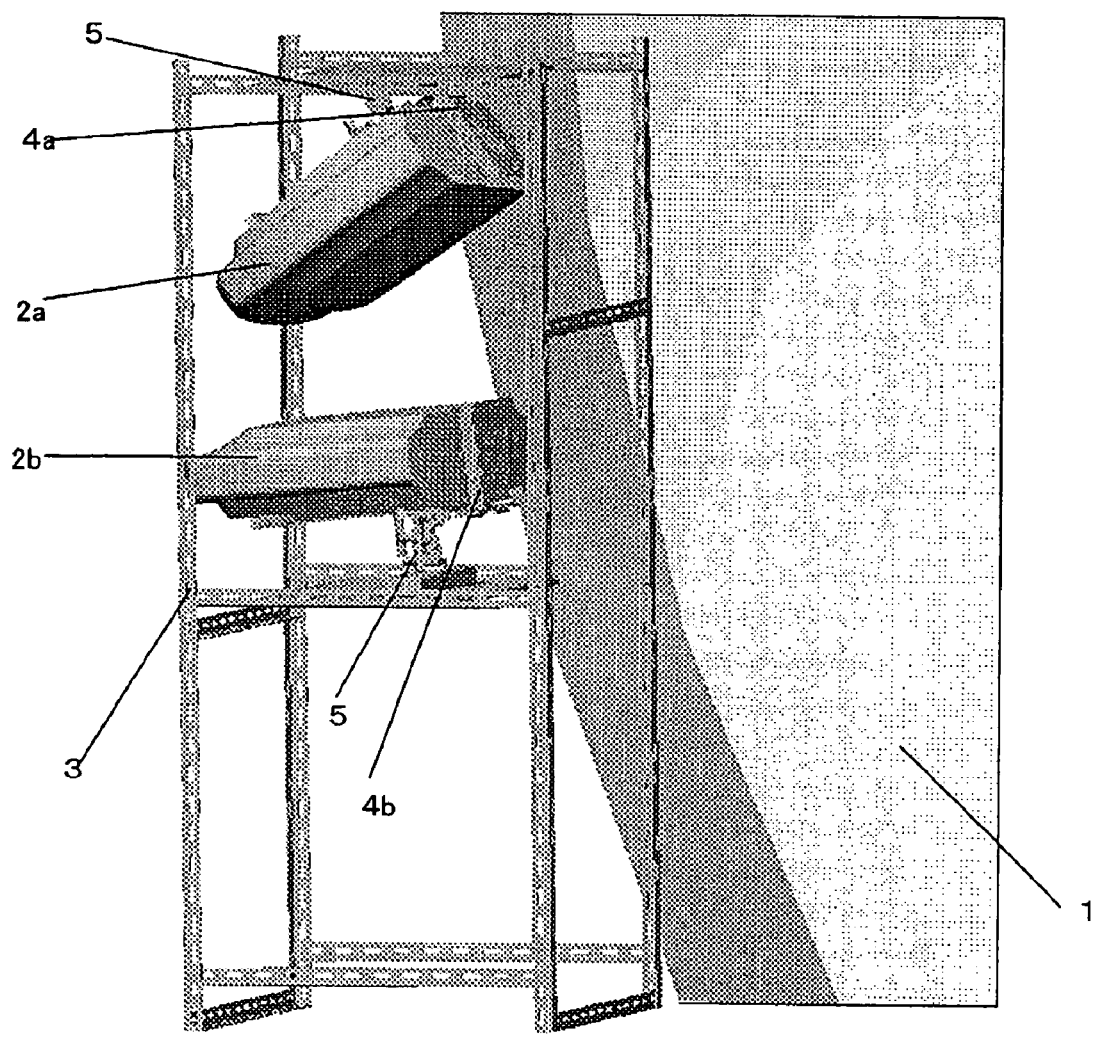
FIG. 4 is a structural view showing in detail two projectors of the image projection system in the first embodiment and the supporting structure to support the projectors.

FIG. 4 is a structural view showing in detail two projectors 2a, 2b and the supporting structure 3 to support the projectors. The projectors 2c and 2d can be structured as shown in FIG. 4. The projectors 2a and 2b are attached to the supporting structure 3 via free camera platforms 5 which can vary the projecting directions of the projectors 2a and 2b freely. Therefore, at the provision of the projectors, the projecting directions of the projectors can be controlled freely.

Then, light shading plates 4a, 4b, 4c and 4d are provided as light shading mechanisms to partially shade the light fluxes from the projectors in front of the projectors, respectively. The shapes of the light shading plates will be described hereinafter.

Figure 5:
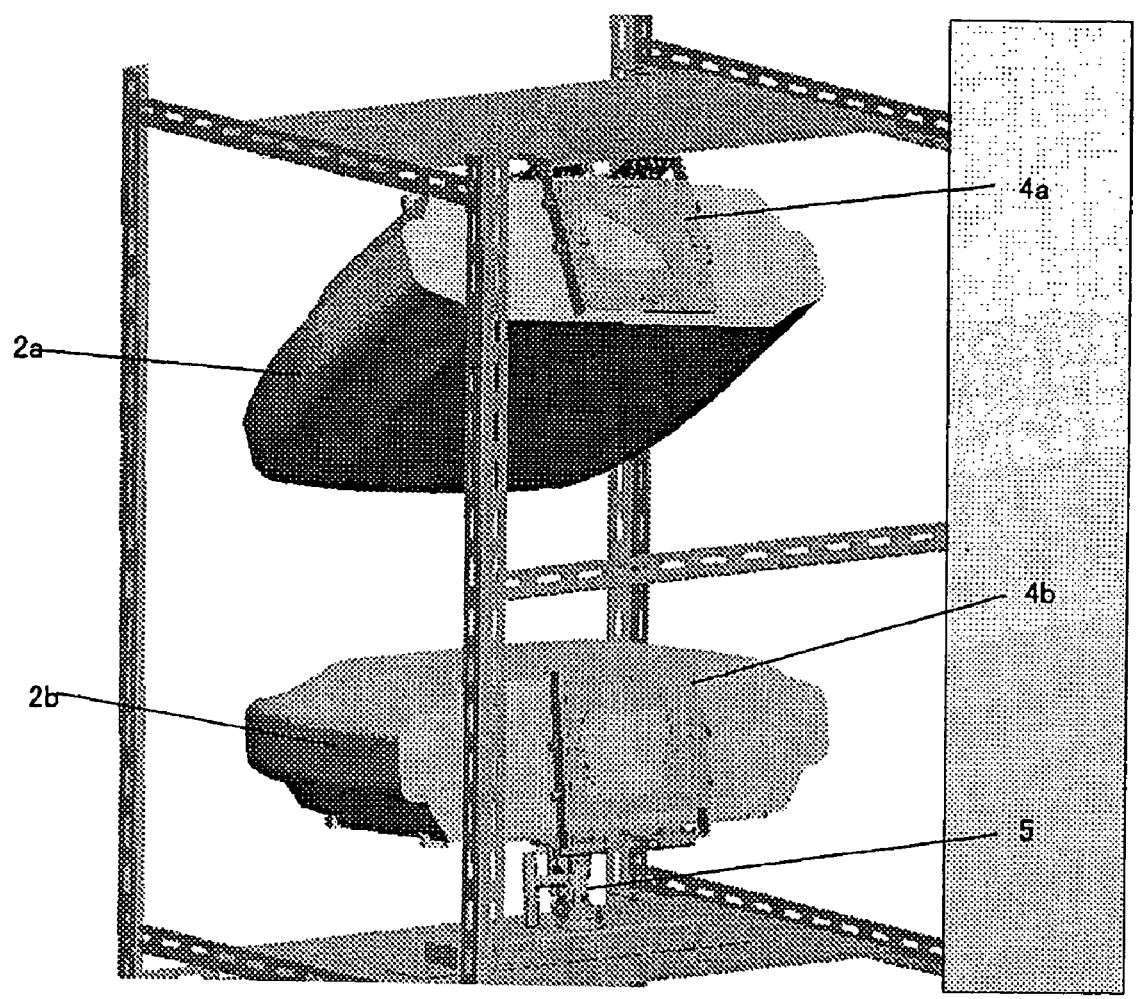
FIG. 5 is an exemplary view of the light shading plate to be used in the image projection system in the first embodiment.

As is apparent from FIG. 5, the light shading plate 4a is disposed in front of the projector 2a to project the corresponding image on the upper right side of the dome-shaped screen 1, and the light shading plate 4b is disposed in front of the projector 2b to project the corresponding image on the lower right side of the dome-shaped screen 1. The edge lines of each light shading plate are shaped in curve, not in line. The light shading plates may be made of metallic material.

The function of the curved edge line of each light shading plate will be described with reference to FIGS. 6-12. As is apparent from FIG. 6, the light shading plate 4a includes a light shading plate 4a-1 with an edge line 6 and a light shading plate 4a-2 with an edge line 7.

The image projecting area of the projector 2a covers over the upper right side of the dome-shaped screen 1 and covers the portion of the upper left side of the dome-shaped screen 1 if the light shading plate 4a is not provided. As shown in FIG. 1, since the projector 2a is disposed at the left side with respect to the opening of the dome-shaped screen 1, the corresponding image from the projector 2a is projected on the dome-shaped screen at a large incident angle. As a result, the image projected area 8 is deformed largely so that the shape of the area 8 becomes a complicated shape from a given rectangular shape.

Figure 8:
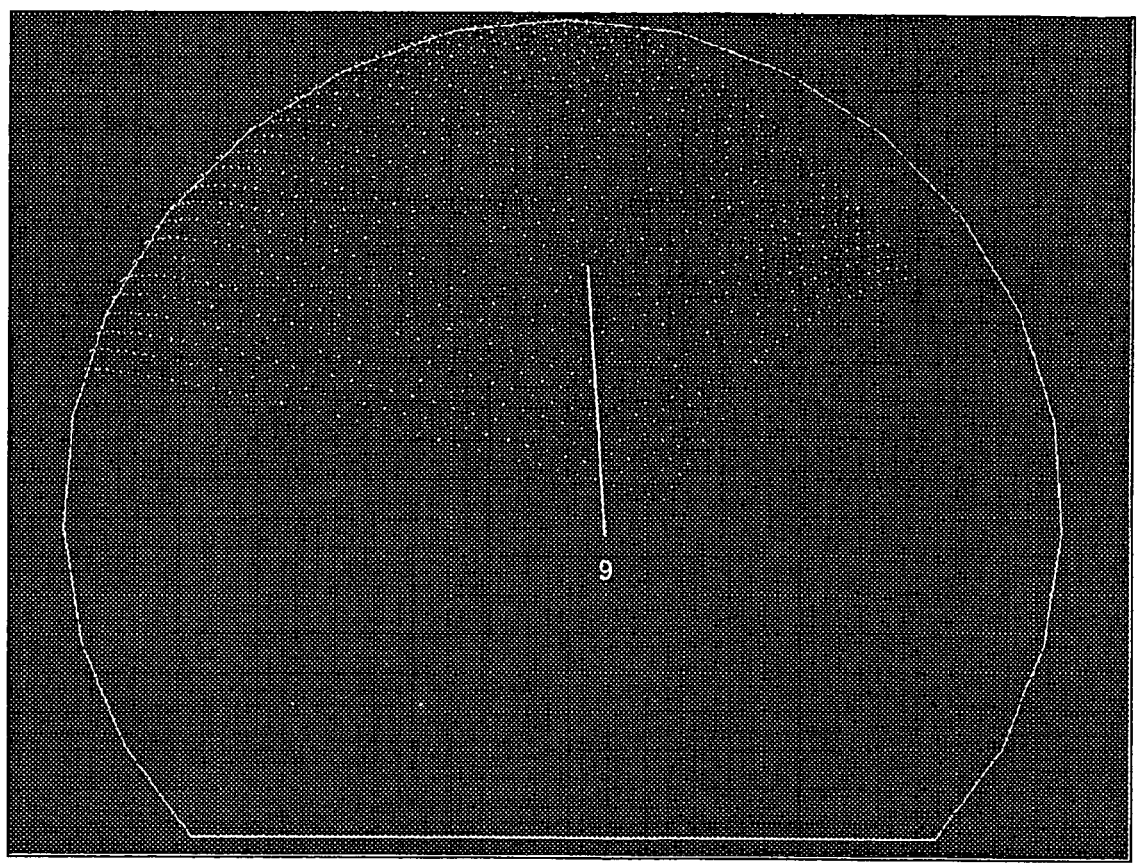
FIG. 8 is still another explanatory view relating to the function of the curved edge line of the light shading plate of the image projection system in the first embodiment.
Figure 9:
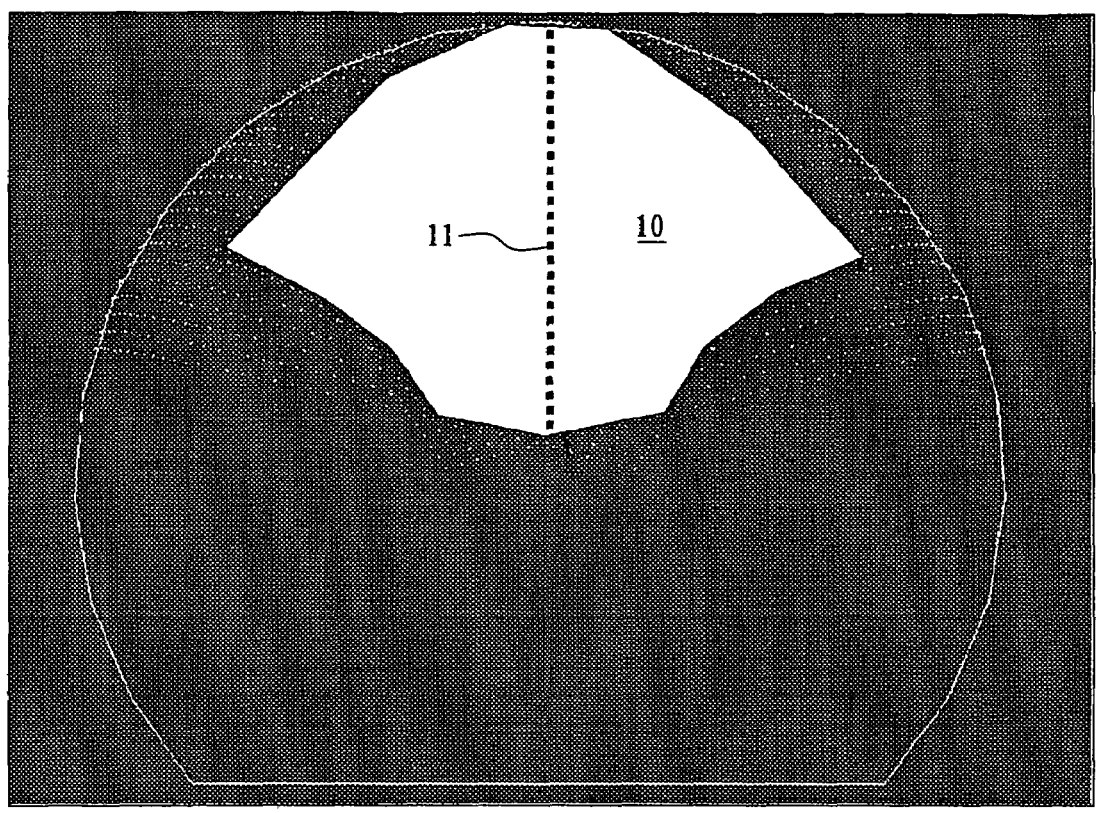
FIG. 9 is a further explanatory view relating to the function of the curved edge line of the light shading plate of the image projection system in the first embodiment.

FIG. 8 shows the image projected area 9 of the projector 2c to project the corresponding image on the upper left side of the dome-shaped screen 1. The image projected area 9 is symmetrical to the image projected area 8 of the projector 2a. As a result, the overlapping portion 10 between the image projected areas 8 and 9 can be represented by the white complicated area as shown in FIG. 9.

In the image projection system in this embodiment, a projected image is captured by an external calibration camera (not shown) and an appropriate geometrical correction is carried out for the projected image on the data of the resultant captured image to correct the image deformation of the projected image. In this case, although the luminance of the projected image may be corrected by means of the same calibration camera on the data of the captured image, if a light shading plate is not employed, the contrast of the projected image may be deteriorated because the luminance of the projected image is corrected on the captured image data to which the luminance of the overlapping portion is not adjusted. For example, if a black image is captured by a projector, the black image can not be captured in real black color because the luminance of the overlapping portions of a plurality of light fluxes constituting the black image is almost n times (n=2, 3 . . . ) as high as the luminance of the non-overlapping portions thereof. In this case, in order to compensate the difference in black luminance between the overlapping portions and the non-overlapping portions, the luminance level in black of the non-overlapping portions may be developed, but resulting in the deterioration in contrast the projected image. In this point of view, in this embodiment, the light shading plates are provided in front of the projectors, respectively to reduce the light intensities from the corresponding projectors for the overlapping portions of the projected image.

Concretely, in this embodiment, the overlapping portion 10 between the image projected areas of the projectors 2a and 2c are shaded by means of the light shading plates 4a and 4c. It is desired that the light shading plates are disposed so as to shade the corresponding sides from the center line of the overlapping portion, respectively. In FIG. 9, therefore, the light shading plates 4a and 4c are configured so as to shade the right side and the left side from the center line 11 of the overlapping portion 10, respectively.

Figure 10:
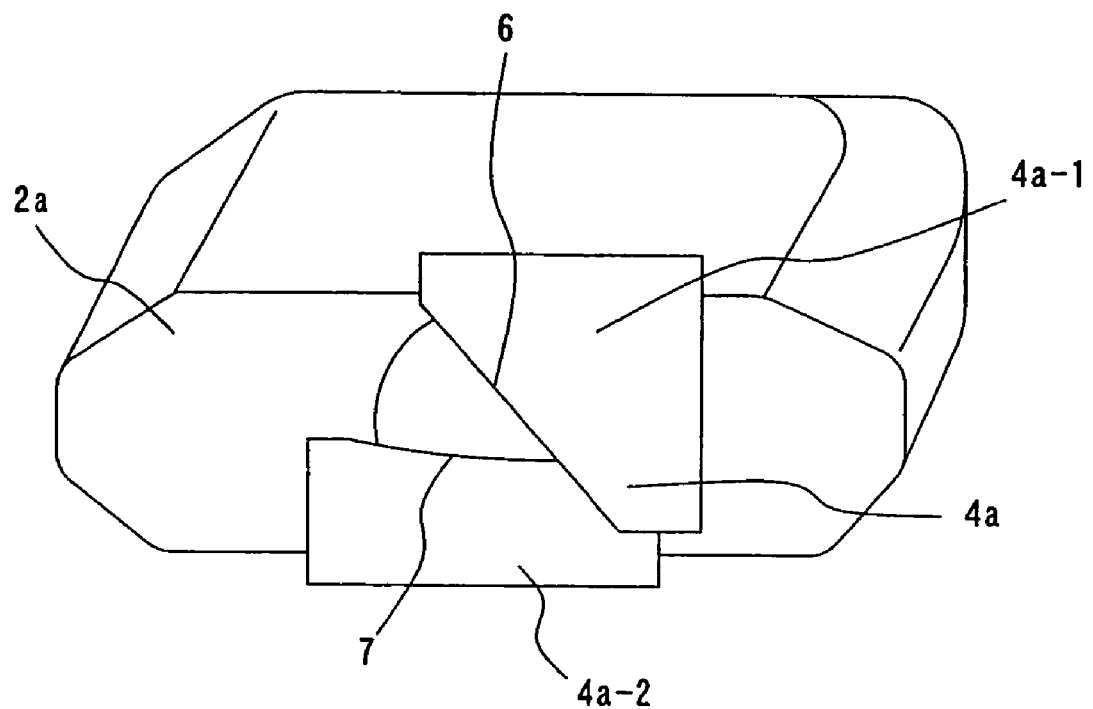
FIG. 10 is a still further explanatory view relating to the function of the curved edge line of the light shading plate of the image projection system in the first embodiment.
Figure 11:
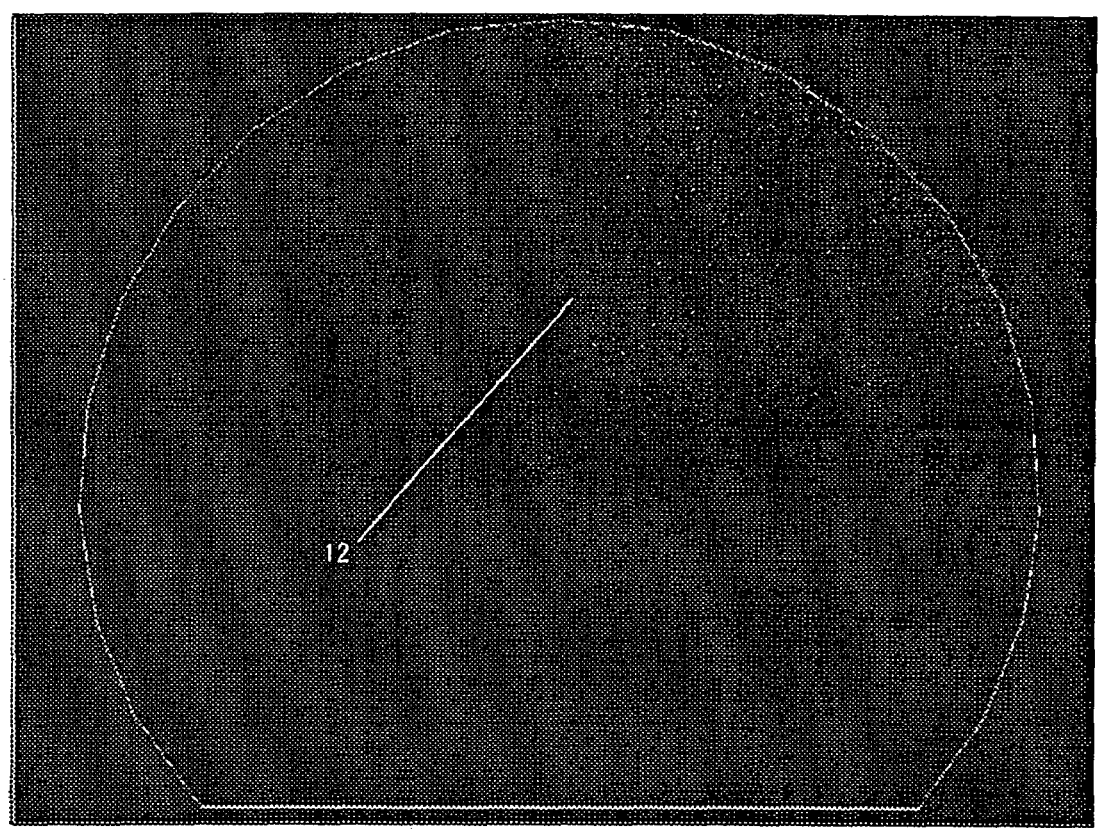
FIG. 11 is another explanatory view relating to the function of the curved edge line of the light shading plate of the image projection system in the first embodiment.
Figure 12:
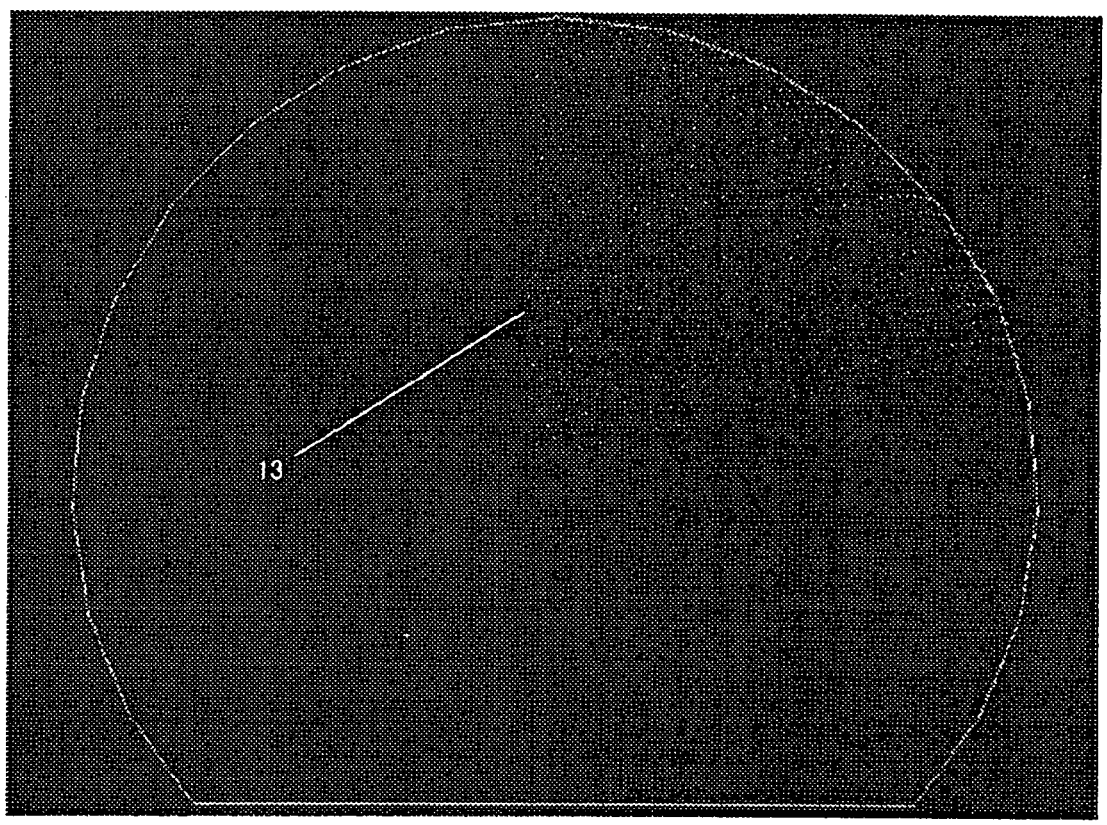
FIG. 12 is still another explanatory view relating to the function of the curved edge line of the light shading plate of the image projection system in the first embodiment.

Then, the shape of the light shading plate as described above will be described. FIG. 10 is an exemplary view wherein the light shading plate 4a with linear edge lines 6 is attached to the projector 2a to project the corresponding image on the upper right side of the dome-shaped screen 1. FIG. 11 is a view showing the state wherein the light flux from the projector 2a is shaded by means of the light shading means 4a with the linear edge lines 6 to form the projected area 8 with the edge portion 12. In this case, the edge portion 12 of the image projected area 8 is largely curved commensurate with the linear shape of the edge lines 6 because the light flux from the projector 2a is projected obliquely so that the linear edge lines 6 of the light shading plate 4a are deformed and curved, as mentioned above.

Figure 6:
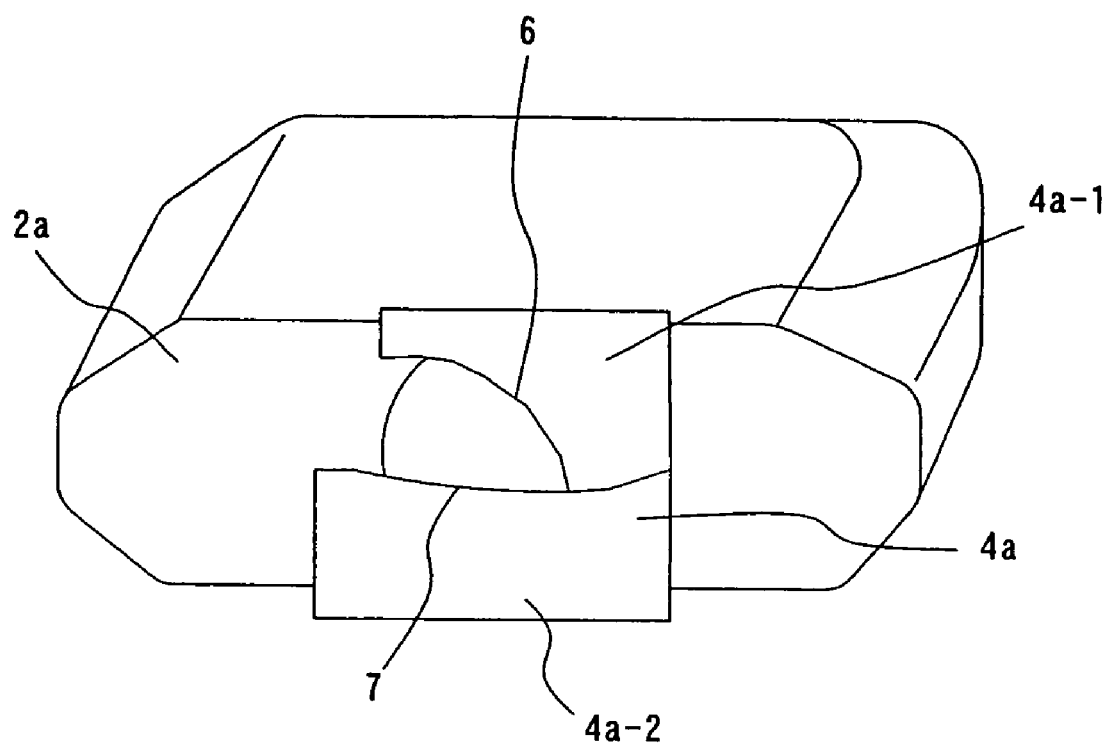
FIG. 6 is an explanatory view relating to the function of the curved edge line of the light shading plate of the image projection system in the first embodiment.
Figure 7:
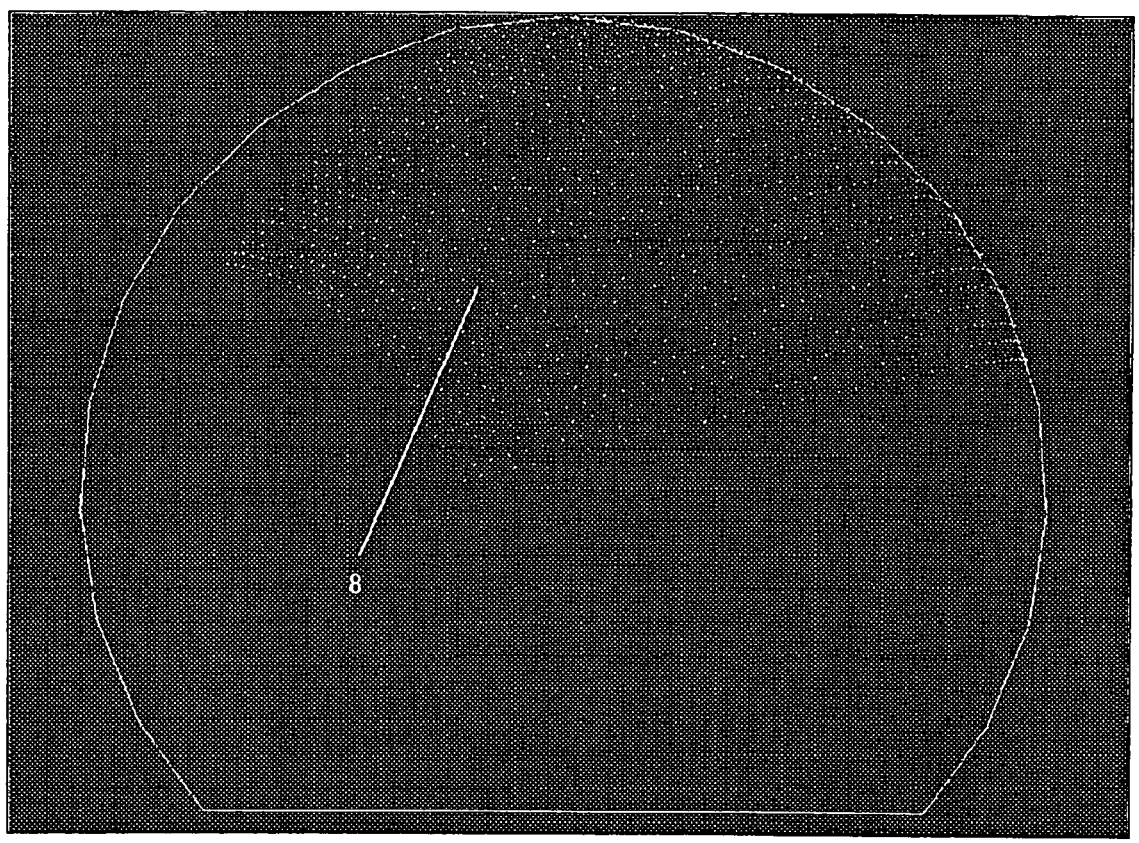
FIG. 7 is another explanatory view relating to the function of the curved edge line of the light shading plate of the image projection system in the first embodiment.

In view of the curvature of the linear edge lines of the light shading plate after the projection of an image, the edge lines of the light shading plate 4a are curved as shown in FIG. 6. The image projected area obtained by shading the light flux with the light shading plate 4a-1 with the curved edge line 6 of the light shading plate 4a can be shown in FIG. 12. Since the edge portion 13 of the image projected area 8 is shaped linearly commensurate with the curved edge line 6 of the light shading plate 4a-1, the right side from the center line 11 of the overlapping area 10 can be shaded.

In this way, since the shapes of edge lines of the light shading plate are curved so that the shading edge lines of the light shading plate can be matched to the center lines of the overlapping portions after projection, the overlapping portions can be shaded so as to realize the blending effect between the overlapping portions and the non-overlapping portions of the projected image.

In this embodiment, although the light shading of the projector 2a for the right side and the left side of the overlapping portion is described, another light shading for other sides of the overlapping portion can be realized. For example, with the light shading of the projector 2a for the vertical sides of the overlapping portion, the light shading plate 4a-2 with the curved edge line 7 of the light shading plate 4 can be utilized. With the light shading of the projector 2b for the lateral sides (right side and left side) of the overlapping portion, the light shading plate 4b with the curved edge lines which are formed vertically at the right side of the plate 4b can be utilized as shown in FIG. 5. With the light shading of the projector 2b for the vertical sides of the overlapping portion, the light shading plate 4b with the curved edge lines which are formed at the upper right side and the upper left side of the plate 4b can be utilized. The light shading plates for the projectors 2c and 2d can be shaped symmetrically for the light shading plates 4a and 4b, respectively.

In this embodiment, although the light flux from each projector is shaded by means of the corresponding light shading plate, the intensity of the light flux is decreased gradually, not remarkably because the exit pupil of the projector is set to a remote area from the light shading plate, so that such a light shading plate as to change the transmittance is not needed.

The light shading plates are provided detachably at the light shading positions of the projectors with hinge mechanisms (not shown). Therefore, when a test pattern which is projected on the dome-shaped screen is captured by an external calibration camera and geometrically corrected, thereby obtaining geometrically corrected data, the light shading plates can be removed from the light shading positions and the test pattern can be captured not under the light shading. Therefore, the geometrically corrected data can be obtained over the entire image containing the overlapping portion which is normally shaded by the light shading, and thus, various data can be calculated for the overlapping portion. As a result, an appropriate geometrical correction can be carried out for the overlapping portion (with the detail explanation of the geometrical correction, refer to Japanese patent application laid-open No. 2001-268476).

As described above, according to the image projection system of this embodiment, when the corresponding images from the projectors 2a, 2b, 2c and 2d are projected and combined to create a large-sized image on the dome-shaped screen 1, the image displaying condition of the overlapping portion of the large-sized image is adjusted by means of the light shading plates 4a, 4b, 4c and 4d with the curved edge lines which are provided for the projectors 2a, 2b, 2c and 2d, respectively. The curved edge lines are shaped by the chipped form in the plates. In this case, for example, the light shading plates includes the light shading plate 4a-1 with the curved edge line 6 corresponding to the center line 11 of the overlapping portion 10 and the light shading plate 4a-2 with the curved edge line 7 corresponding to another center line of another overlapping portion. As a result, the vertical sides or the lateral sides (right side and left side) of the overlapping portion, which is originated from the overlapping of the light fluxes from the projectors, can be adjusted in luminance by means of the light shading plates so that the curved edge lines of the light shading plates are matched to the center lines of the overlapping portions. Therefore, the luminance of the image projected on the dome-shaped screen can be adjusted in the same manner as the planer screen and the black floats can be prevented effectively.

Accordingly, the luminance of the overlapping portions can be set easily equal to the luminance of the non-overlapping portions on the dome-shaped screen, so that a high blending effect can be provided to the image projection system of the present invention.

In the image projection system of this embodiment, although four projectors are employed as image projecting means, the number of projector is not limited. For example, eight projectors may be used so as to project a finer image. Many projectors may be also provided so as to project a soccer ball-shaped image made of the partial images from the corresponding projectors.

Although the present invention was described in detail with reference to the above examples, this invention is not limited to the above disclosure and every kind of variation and modification may be made without departing from the scope of the present invention.

What is claimed is:

1. An image projection system comprising:
   a plurality of image projecting means, and
   a plurality of light shading mechanisms for adjusting image displaying conditions of overlapping portions of an image composed of partial images projected on a dome-shaped screen from said image projecting means, each mechanism being provided for each image projecting means,
   wherein each light shading mechanism includes at least one light shading plate with a non-linear form therein, and after projection, said non-linear form is defined by a curved edge line corresponding to a center line of an overlapping portion of said overlapping portions.

2. The image projection system as defined in claim 1, wherein each light shading mechanism is provided detachably from the corresponding light shading position on an optical path of the corresponding image projecting means.

3. The image projection system as defined in claim 1, wherein said dome-shaped screen is formed in a partially semisherical shape by cutting a bottom portion of said screen by a given dimension in the order smaller than a radium of said screen, and said image projecting means are arranged at a right side and a left side of said screen as viewed from a front of said screen so that projecting directions of said image projecting means are directed downward and upward for said screen, respectively.

4. The image projection system as defined in claim 1, wherein each light shading mechanism includes a first shading plate with said first curved edge line and a second shading plate with said second curved edge line.

5. The image projection system as defined in claim 1, wherein said image projecting means are supported by free camera platforms to vary projecting directions of said image projecting means freely, respectively.

6. The image projection system as defined in claim 4, wherein said first shading plate and said second shading plate are made of metallic material.

7. The image projection system as defined in claim 3, wherein each light shading mechanism is configured so as to be detachably at a light shading position of the corresponding projector with a hinge mechanism.

8. The image projection system as defined in claim 1, where said overlapping portions form polygonal shapes, respectively, each shape having four or more sides.

* * * * *